(12) United States Patent
Sase (10) Patent No.: US 7,954,885 B2
(45) Date of Patent: Jun. 7, 2011

(54) INSTALLATION STRUCTURE OF RESIN GARNISH

(75) Inventor: Hiroyuki Sase, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 335 days.

(21) Appl. No.: 12/391,676

(22) Filed: Feb. 24, 2009

(65) Prior Publication Data
US 2009/0218850 A1 Sep. 3, 2009

(30) Foreign Application Priority Data
Feb. 29, 2008 (JP) ................. 2008-049845

(51) Int. Cl.
*B60R 99/00* (2009.01)
(52) U.S. Cl. ..................................... 296/191
(58) Field of Classification Search .......... 296/209, 296/199, 202, 193.07, 191, 187.08, 146.9, 296/207, 1.08
See application file for complete search history.

(56) References Cited

U.S. PATENT DOCUMENTS 6,095,591 A * 8/2000 Matsuyama et al. ..... 296/187.05
6,435,602 B1 * 8/2002 Sukegawa et al. ............ 296/191
7,168,757 B2 * 1/2007 Futatsuhashi ................. 296/209
2007/0164585 A1 7/2007 Hasegawa et al.

FOREIGN PATENT DOCUMENTS

| EP | 1 798 113 | 6/2007 |
|---|---|---|
| JP | 62-008844 | 1/1987 |
| JP | 2001-071830 | 3/2001 |
| JP | 2002-283932 | 10/2002 |
| JP | 2005-119456 | 5/2005 |
| JP | 2005-119457 | 5/2005 |
| JP | 62-068120 | 7/2009 |
| WO | 2005/030513 | 4/2005 |

* cited by examiner

Primary Examiner — Lori L Lyjak
(74) Attorney, Agent, or Firm — Rankin, Hill & Clark LLP (57) ABSTRACT

A resin garnish installation structure installed to a vehicle body exterior surface, having a resin garnish which extends along a longitudinal direction thereof, the resin garnish including: an exterior surface which is level with the vehicle body exterior surface; a first edge which extends along the longitudinal direction; a second edge which is provided on an opposite side of the first edge and extends along the longitudinal direction; and an end part provided at a tip in the longitudinal direction, wherein in a vicinity of the end part, the second edge gradually curbs toward the first edge, and the second edge joins the first edge at the end part, and the resin garnish is installed so that a gap is formed between the end part and the vehicle body exterior surface, the gap becoming wider as it gets closer to the tip of the resin garnish.

4 Claims, 7 Drawing Sheets

INSTALLATION STRUCTURE OF RESIN GARNISH

BACKGROUND OF THE INVENTION

1. Field of the Invention

The present invention relates to an installation structure of resin garnish used in vehicles such as automobiles.

2. Description of Related Art

Some of vehicles such as automobiles are provided with window-side garnishes around the side ends of the front windshield, e.g., on a front pillar. Such window-side garnish has a long dimension and are regularly made of resin. Accordingly, it is necessary to consider heat deformation of the garnish and resulting expansions and contractions thereof. In order to deal with such expansions and contractions by heat, for example, Japanese Unexamined Patent Application, First Publication No. 2005-119457 discloses a structure in which a window-side garnish and another adjacent member, such as a cowling-top garnish, are arranged so as to overlap to each other at their ends.

However, in some arrangements, those two members are required to be tandemly arranged so that their ends engage against each other in an head-to-head manner. In this case, it is necessary to design the engaging portion to have a fine appearance while also coping with the expansions and contractions by heat, and to avoid the garnish arrangement from hindering the exterior appearance quality.

Therefore, an object of the present invention is to provide an installation structure of resin garnish in which a resin garnish and another member is tandemly arranged so that their ends are engaging against each other, having a fine appearance and capable of coping with heat expansions and contractions.

SUMMARY OF THE INVENTION (1) An aspect of the present invention provides the following: a resin garnish installation structure installed to a vehicle body exterior surface, having a resin garnish which extends along a longitudinal direction thereof, the resin garnish including: an exterior surface which is level with the vehicle body exterior surface; a first edge which extends along the longitudinal direction; a second edge which is provided on an opposite side of the first edge and extends along the longitudinal direction; and an end part provided at a tip in the longitudinal direction, wherein in a vicinity of the end part, the second edge gradually curbs toward the first edge, and the second edge joins the first edge at the end part, and the resin garnish is installed so that a gap is formed between the end part and the vehicle body exterior surface, the gap becoming wider as it gets closer to the tip of the resin garnish.

(2) The resin garnish installation structure may be constituted as follows: the resin garnish installation structure further includes an elastic lip provided between the end part of the resin garnish and the vehicle body exterior surface, wherein the elastic lip becomes wider as it gets closer to the tip of the resin garnish.

(3) The resin garnish installation structure may be constituted as follows: the elastic lip includes: a mold-cast portion formed at the tip of the resin garnish by a mold-casting, so as to become wider as it gets closer to the tip of the resin garnish; and an extrusion-mold portion formed by an extrusion molding, and formed continuously with the mold-cast portion.

(4) The resin garnish installation structure may be constituted as follows: the tip of the resin garnish is provided adjacent to a junction between two parts of the vehicle body, and a junction between the mold-cast portion and the extrusion-mold portion is provided at a portion away from the junction between two parts of the vehicle body.

According to the above-described structure of (1), a sufficient expansion-contraction margin is provided at a tip part of the resin garnish. In addition, a gap along the longitudinal direction is arranged to be as small as possible. In this way, there is an advantageous effect of the structure being able to cope with effects of heat, while maintaining a fine appearance of the structure.

According to the above-described structure of (2), by configuring the elastic lip according to variations of gap size, the gap can be efficiently sealed. In addition, unintended counterforce by the elastic lip at the engaging part of the end part of the resin garnish and the vehicle body member can be avoided, resulting in an excellent engagement status.

According to the above-described structure of (3), portions of the elastic lip having width variation are formed by a mold-casting. In this way, the elastic lip can be formed with precision into a desired shape. By forming the other parts of the elastic lip with extrusion molding, the production cost can be reduced.

According to the above-described structure of (4), the seam part of the elastic lip and the seam part of the vehicle body is not provided adjacent to each other. In this way, those seam parts do not appear conspicuously. In addition, the assemble status of the structure can be made steady.

DETAILED DESCRIPTION OF THE INVENTION

An embodiment of the present invention will be described below with reference to the drawings.

Figure 1:
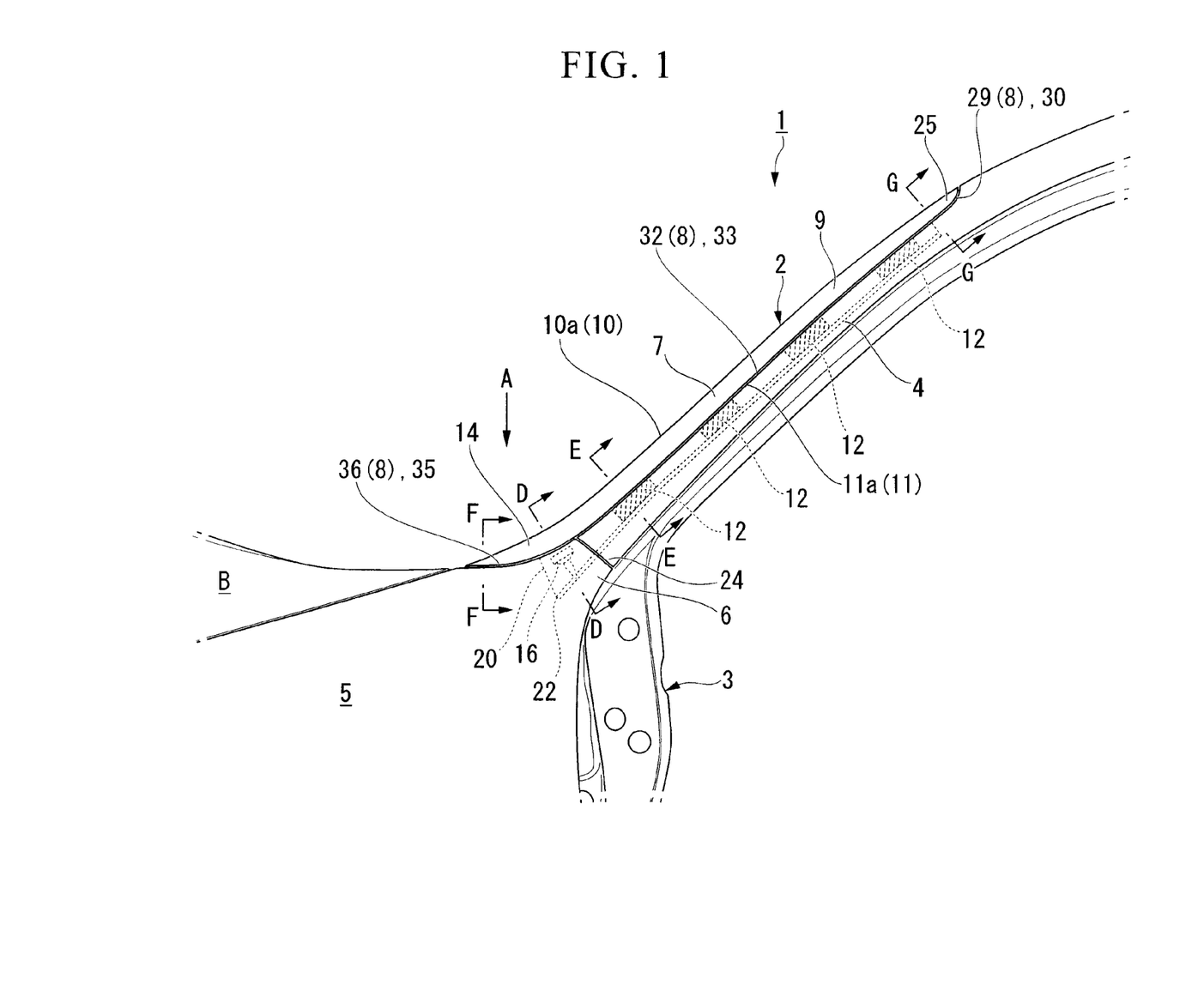
FIG. 1 is a perspective view from a front-left position showing a vehicle according to an embodiment of the present invention.

As shown in FIG. 1, the front pillar 2 of the vehicle body 1 is provided with a pillar outer panel 4 of an outside panel 3. The pillar outer panel 4 is provided with a rear-upper end portion 6 of a front fender panel 5, so that their exterior surfaces are level.

At the part along the upper part of the pillar outer panel 4 extending to the rear-upper end portion 6 of the front fender panel 5, a window-side garnish 7, which is made with resin and extends along the longitudinal direction thereof, is provided so as to adjacently extend along both of the pillar outer panel 4 and the front fender panel 5, at the inside of the vehicle width direction. The window-side garnish 7 is an ornamental member provided on an exterior surface of the vehicle body. Along the gap between the window-side garnish 7 and the pillar outer panel 4/front fender panel 5, a parting line 8 is provided. The parting line 8 maintains the gap between those adjacent members. The displacement of the window-side garnish 7 at a rear-end part 25 is restricted. The heat expansions and contractions of the window-side garnish 7 is absorbed at the side of a front-end part 14. Symbol B shows a bonnet.

Figure 6:
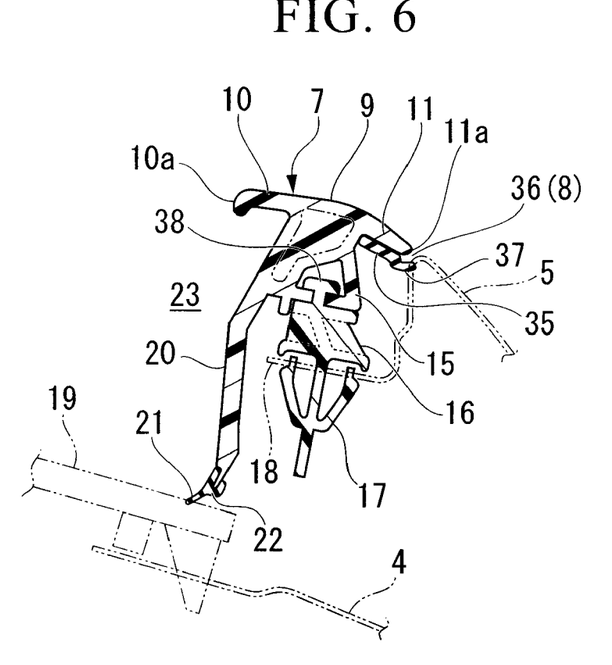
FIG. 6 is a sectional view along the line D-D in FIG. 1.
Figure 7:
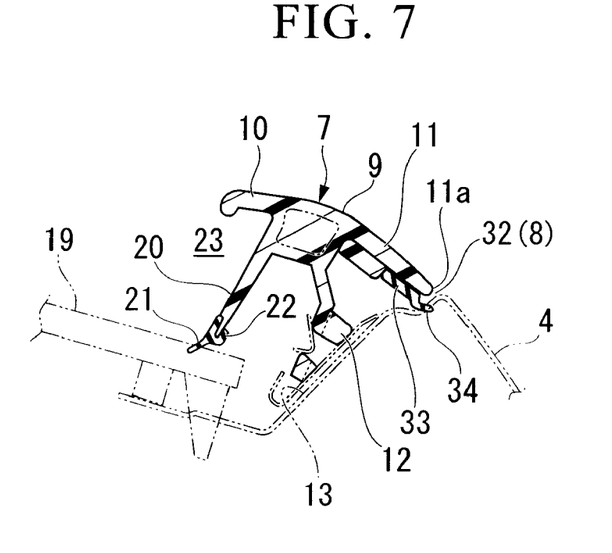
FIG. 7 is a sectional view along the line E-E in FIG. 1.

As also shown in FIGS. 6 to 9, the window-side garnish 7 is provided with an ornamental part 9 having an outer surface which is level with the outer surfaces of the adjacent pillar outer panel 4 and the front fender panel 5. The ornamental part 9 is provided with an inside-fringe part 10 and an outside-fringe part 11, at the center part of the width direction, each extending in an slanted direction toward either inward or outward. As shown in FIG. 7, at the back side of the ornamental part 9, at a vehicle-width outer side, four brackets 12 extending downward direction are provided along the longitudinal direction of the window-side garnish 7, with predetermined intervals. The brackets 12 are secured on an inside surface 13 of the pillar outer panel 4.

As shown in FIG. 6, a backside of the front-end part 14 of the ornamental part 9 is provided with a connection part 15. An upper fastening part 38 of a clip 16 is held at the connection part 15 in a slidable manner along the longitudinal direction of the window-side garnish 7 (the direction orthogonal to the figure sheet). The lower fastening part 17 of the clip 16 is held and fixed at an internal rack part 18 of the front fender panel 5.

Accordingly, the clip 16 is fixed at the internal rack part 18 of the front fender panel 5, while the upper fastening part 38 of the clip 16 is slidable in relation to the connection part 15 at the backside of the front-end part 14 of the ornamental part 9. Therefore, the displacement of the window-side garnish 7 caused by heat expansion/contraction can be smoothly performed at the front-end part.

The ornamental part 9 is provided with a leg part 20 at the inside of the vehicle width direction. The leg part 20 extends toward the front windshield 19, and arranged so that the longitudinal direction of the leg part 20 runs along the longitudinal direction of the window-side garnish 7. A seal member 22 fits into the leg part 20. A seal lip 21 of the seal member 22 tightly engages with the front windshield 19. The extending height of the leg part 20 becomes progressively shorter as it goes closer to the rear end of the window-side garnish 7. As a result of the connection at the seal member 22, a drip part 23 is positioned at a side of the front windshield 19. The drip part 23 has a C-shaped cross-section and is constituted with the inside-fringe part 10 of the ornamental part 9 of the window-side garnish 7, the leg part 20, and the front windshield 19.

Figure 2:
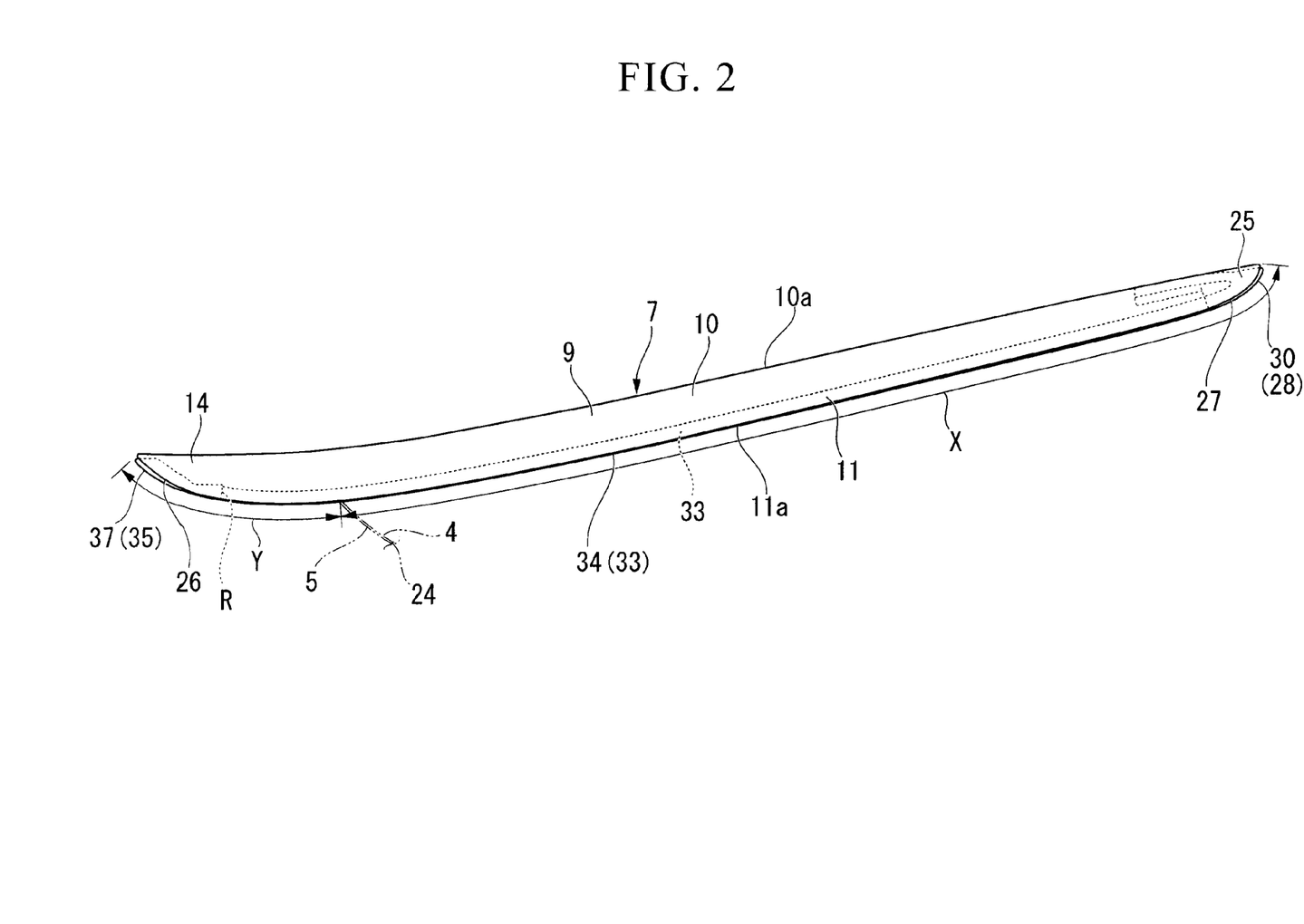
FIG. 2 is a plan view showing a resin garnish of the embodiment.

As shown in FIG. 2, the front-end part 14 of the ornamental part 9 of the window-side garnish 7 has a tapered shape in which an edge part 11a of the outside-fringe part 11 becomes gradually closer to an edge part 10a of the inside-fringe part 10, as it goes closer to the tip. The front-end part 14 is provided adjacent to a parting line 24 between the pillar outer panel 4 and the front fender panel 5. A rear-end part 25 of the window-side garnish 7 also has a tapered shape in which the edge part 11a of the outside-fringe part 11 becomes closer to the edge part 10a of the inside-fringe part 10, as it goes closer to the tip.

Accordingly, the front-end part 14 of the window-side garnish 7 is provided with a front arc part 26, on the edge part 11a of the outside-fringe part 11. Likewise, the rear-end part 25 is provided with a rear arc part 27, also on the edge part 11a of the outside-fringe part 11.

On the back surface of the rear-end part 25 of the ornamental part 9, a rear elastic lip 28 is adhered, on a part of the back surface ranging from the rear arc part 27 to a part of the edge part 10a on the side of the inside-fringe part 10 which is further front than the rear arc part 27.

The rear elastic lip 28 has a shape which approximately fits the rear-end part 25 of the ornamental part 9. The rear elastic lip 28 is provided with a rear arc lip 30 which extends outward from the rear arc part 27 by a shape corresponding to a rear gap 29 (shown in FIG. 1) which opens between the rear arc part 27 of the ornamental part 9 and the pillar outer panel 4.

The rear arc lip 30 fits the rear gap 29 to fill the rear gap 29. A tip of the rear arc lip 30 tightly engages with the pillar outer panel 4.

Figure 9:
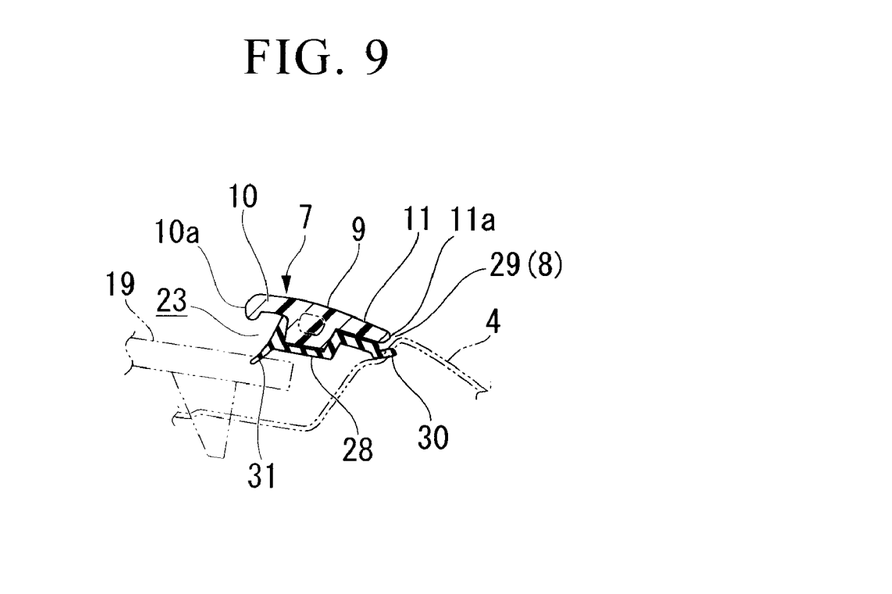
FIG. 9 is a sectional view along the line G-G in FIG. 1.

As shown in FIG. 9, a seal lip 31 is provided at an inner edge of the rear elastic lip 28. The seal lip 31 is tightly attached to the front windshield 19. The rear elastic lip 28 is formed by a mold-casting.

A side elastic lip 33 is adhered at a side part of the window-side garnish 7, on the back surface of the outside-fringe part 11 of the ornamental part 9. The side elastic lip 33 is connected to the rear elastic lip 28 and extends to a position of the front-end part 14 of the window-side garnish 7. Although the side elastic lip 33 has a shape which approximately fits the edge part 11a of the outside-fringe part 11 of the ornamental part 9, the side elastic lip 33 is provided with a side part lip 34. The side part lip 34 extends outward from the edge part 11a of the outside-fringe part 11 of the ornamental part 9 by a shape corresponding to a side gap 32 (as shown in FIGS. 2 and 7) which opens between the outside-fringe part 11 of the ornamental part 9 and the pillar outer panel 4/the front fender panel 5. The side part lip 34 fits the side gap 32 to fill the side gap 32. A tip of the side part lip 34 tightly engages with the pillar outer panel 4 and the front fender panel 5. The side elastic lip 33 is formed by an extrusion molding.

A front elastic lip 35 is adhered at the front-end part 14 of the ornamental part 9, on the back surface of the outside-fringe part 11. The front elastic lip 35 is provided at a position extending from the front arc part 26 to the edge part 10a of the inside-fringe part 10. The front elastic lip 35 is provided continuously with the side elastic lip 33 so as to engage with the side elastic lip 33. The junction Rat which the side elastic lip 33 and the front elastic lip 35 engages is provided at a position different from the parting line 24 between the pillar outer panel 4 and the rear-upper end portion 6 of the front fender panel 5. The junction R is shifted further front than the parting line 24.

Figure 8:
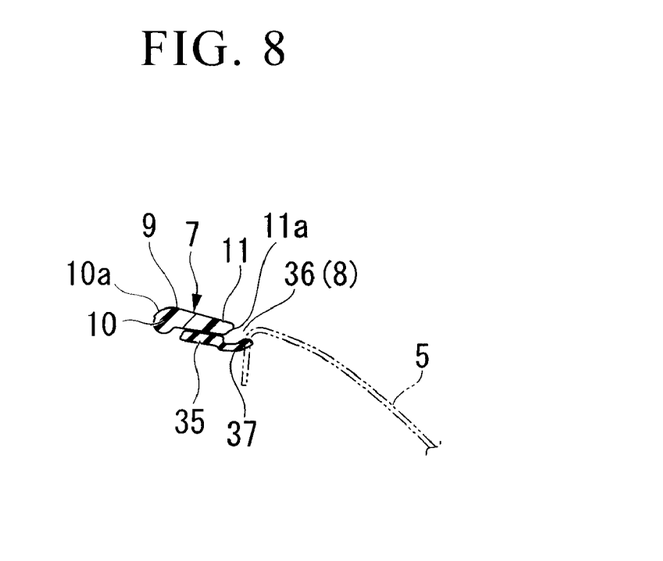
FIG. 8 is a sectional view along the line F-F in FIG. 1.

The front elastic lip 35 has a shape which approximately fits the front arc part 26 of the front-end part 14 of the ornamental part 9. The front elastic lip 35 is provided with a front arc lip 37 which extends outward from the front arc part 26 by a shape corresponding to a front gap 36 which opens between the front arc part 26 of the ornamental part 9 and the front fender panel 5. The front arc lip 37 fits the front gap 36 to fill the front gap 36. A tip of the front arc lip 37 tightly engages with the front fender panel 5 (as shown in FIGS. 6 and 8). The parting line 8 consists of the rear gap 29, the side gap 32, and the front gap 36. The front elastic lip 35 is formed by a mold-casting.

Figure 3:
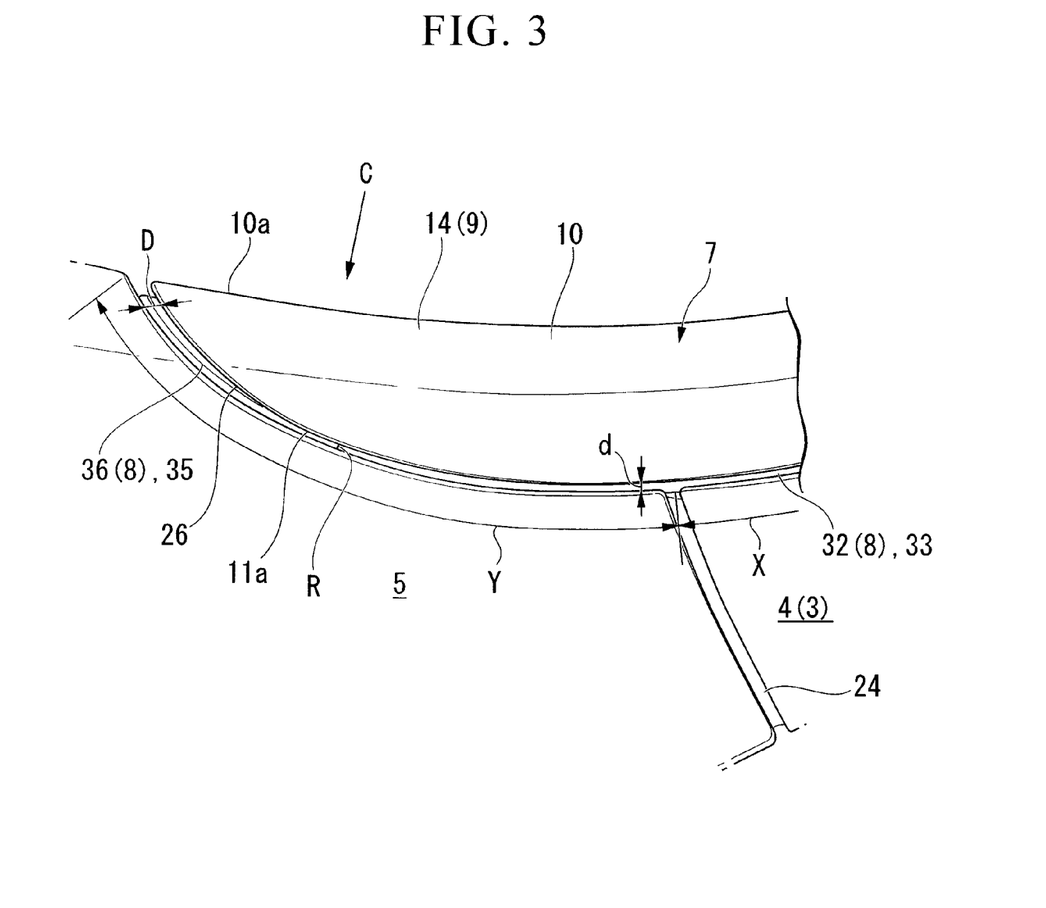
FIG. 3 is a view looking from the direction of A in FIG. 1.
Figure 4:
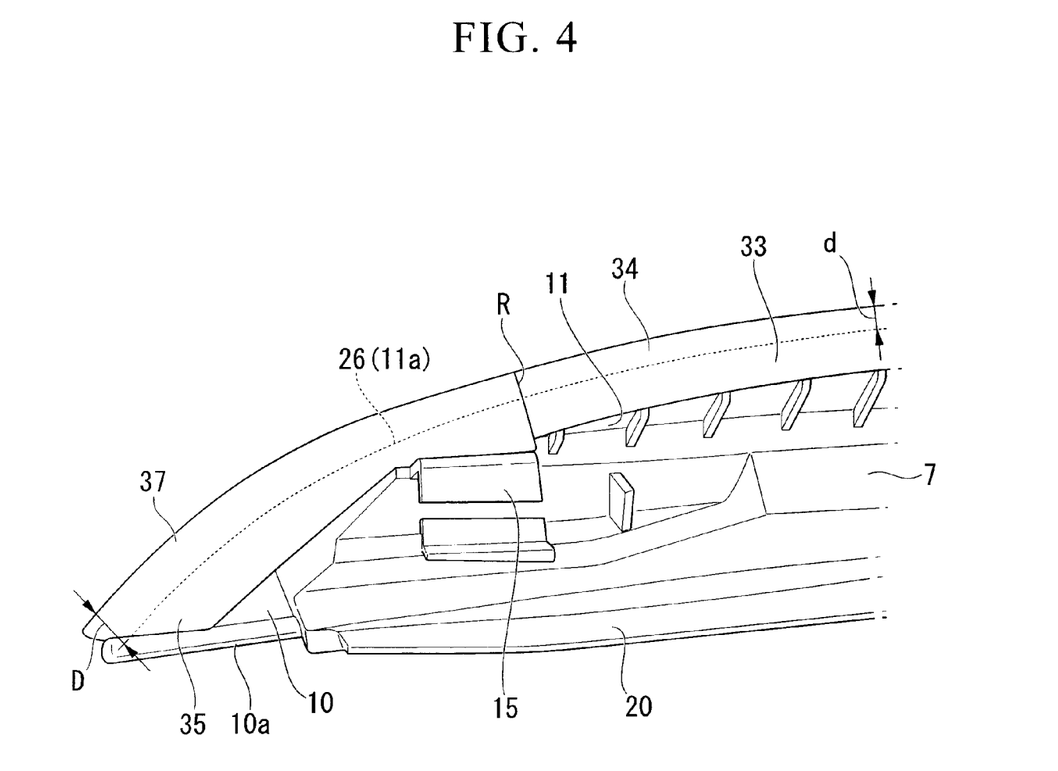
FIG. 4 is a view looking from the direction of B in FIG. 5.

As shown in FIGS. 3 and 4, the parting line 8 has an approximately constant width d at the entire rear gap 29 and in the range X of the side gap 32 starting from the rear gap 29 and reaching to the parting line 24 between the front fender panel 5 and the pillar outer panel 4. However, this is not the case at the other parts of the side gap 32, namely, in the range Y, which includes the front gap 36 and the part further to the front than the parting line 24 of the front fender panel 5 and the pillar outer panel 4. In the range Y, as it gets closer to the front end, the width of the parting line 8 becomes gradually wider.

In other words, the parting line 8 has the same width d as in the range X at the position of the parting line 24 between the front fender panel 5 and the pillar outer panel 4. In the range further front than the parting line 24, the width of the parting line 8 becomes gradually wider until it finally reaches the width D (d<D). At the side part of the window-side garnish 7, the parting line 8 extrudes sidewise by the width D. The width gradually increases as the parting line 8 extends bending inward along the front arc part 26. At the tip of the window-side garnish 7, the parting line 8 extrudes to the front direction by the width D.

Correspondently, the extruding width of the side part lip 34 of the side elastic lip 33 provided in the range Y is adjusted by shifting the installation position of the side elastic lip 33 relative to the ornamental part 9. On the other hand, the extruding width of the front arc lip 37 of the front elastic lip 35 is adjusted by the mold casting of the part, so that the extrusion width becomes gradually wider from the width d finally to the width D.

Figure 5:
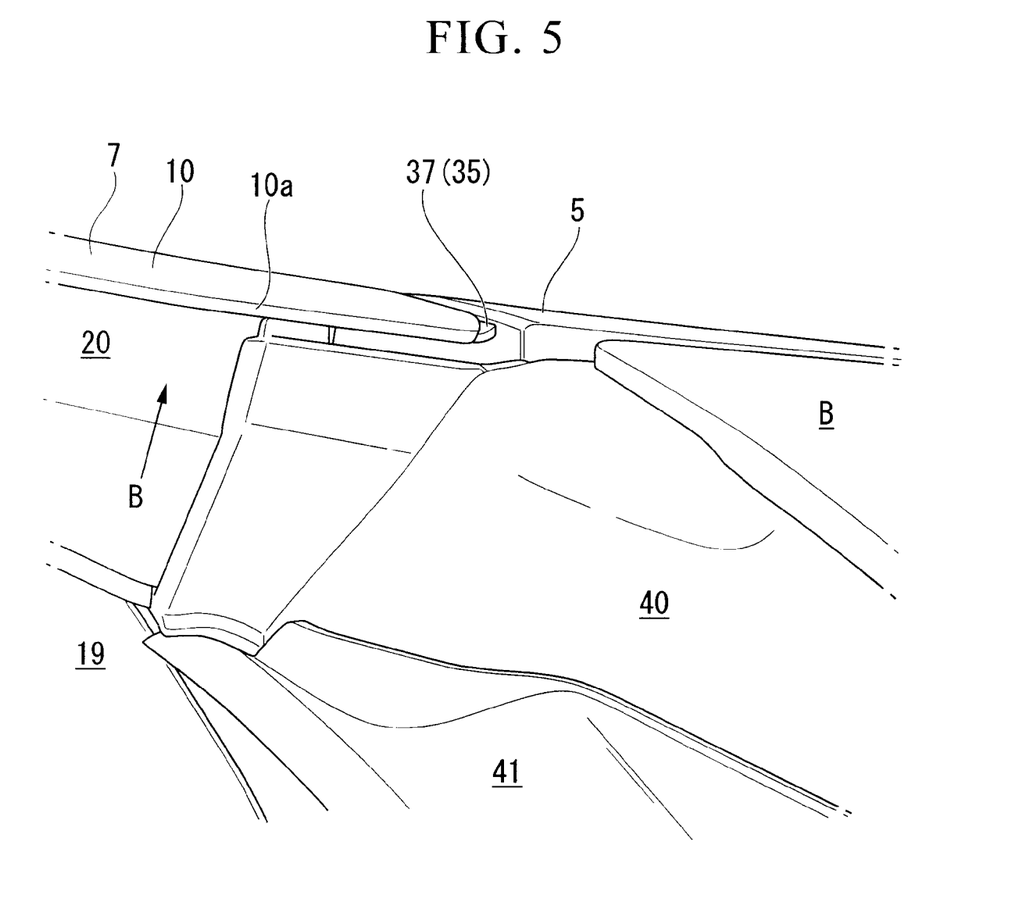
FIG. 5 is a view looking from the direction of C in FIG. 3.

As shown in FIG. 5, a hinge cover 40 is provided on the internal rack part 18 of the front fender panel 5 so as to cover the junction of the window-side garnish 7 and the front fender panel 5, and cover the hinge which supports the bonnet B. The reference symbol 41 in FIG. 5 shows a cowling-top garnish provided at the underside edge of the front windshield 19.

The window-side garnish 7 is made with resin and is tend to be affected by heat, resulting in substantial expansions and contractions of the window-side garnish 7 along the longitudinal direction thereof, and dislocations at the front-end part 14. The range Y of front-end part 14 includes the front gap 36 and the part of the side gap 32 further to the front than the parting line 24 of the front fender panel 5 and the pillar outer panel 4. In the above-explained embodiment, in the range Y, the width of the parting line 8 becomes gradually wider as it goes closer to the front part thereof, until it finally reaches the width D (d<D).

The front arc part 26 is provided at the front-end part 14 of the window-side garnish 7. At the front arc part 26, the parting line 8 gradually bends inward as it gets closer to the tip part thereof. Accordingly, a larger margin for the expansion of the window-side garnish 7 along the longitudinal direction thereof is prepared at the front part of the window-side garnish 7. Therefore, a sufficient margin for the expansion can be secured at the front-end part 14 of the window-side garnish 7.

The range X portion of the parting line 8 resides along the longitudinal direction of the window-side garnish 7. Since the width of the window-side garnish 7 is smaller than the length thereof, the displacement due to the heat is smaller in the range X. Therefore, in the range X, a smaller expansion-contraction margin is necessary, and the width of the protruding part can be maintained constant throughout the range X at the width d. The width d of the protruding part can be configured as small as possible, in order to realize a constitution which can deal with effects of heat, while having a fine appearance.

Particularly, the side part lip 34 of the side elastic lip 33 and the front arc lip 37 of the front elastic lip 35 are each designed to fit the varying width of the parting line 8 between the window-side garnish 7 and the adjacent pillar outer panel 4/front fender panel 5. Accordingly, the parting line 8 can be securely sealed.

Accordingly, an excellent engaging status between the window-side garnish 7 and the adjacent pillar outer panel 4/front fender panel 5 can be obtained, without producing an unintended counterforce by the side part lip 34 and the front arc lip 37.

At the front-end part 14 of the window-side garnish 7, the dislocation caused by the effect of heat is larger. As the width of the side gap 32 changes from width d to width D in the front-end part 14, the extruding length d of the side part lip 34 of the side elastic lip 33 changes to the extruding length D of the front arc lip 37 of the front elastic lip 35 within the range Y. Accordingly, the lip width is widened so as to fit the width of the parting line 8. Therefore, as the dislocation of the side gap 32 and the front gap 36 caused by heat becomes larger, the lips can bend further, so that the engaging part between the window-side garnish 7 and the pillar outer panel 4/front fender panel 5 can be maintained in an appropriate status.

Since the front elastic lip 35 is formed by a mold-casting, the extrusion length of the front elastic lip 35 can be adjusted with a precise accuracy into a desired shape, so as to fit with the shape of the parting line 8 as the width changes in the part of the side gap 32 and in the front gap 36. On the other hand, the side elastic lip 33 is formed at a low cost by an extrusion molding.

The junction R of the side elastic lip 33 and the front elastic lip 35 is located at a different position (further to the front) from the position of the parting line 24 between the pillar outer panel 4 and the rear-upper end portion 6 of the front fender panel 5. Accordingly, the connection at the junction R of the side elastic lip 33 and the front elastic lip 35 is not positioned at the same position with the parting line 24 between the pillar outer panel 4 and the rear-upper end portion 6 of the front fender panel 5. Therefore, those junctions, i.e., the junction R and the parting line 24 do not appear conspicuous. In addition, the assemble status of the structure can be made steady.

What is claimed is:

1. A resin garnish installation structure installed to a vehicle body (1) exterior surface, comprising a resin garnish (7) which extends along a longitudinal direction thereof, the resin garnish (7) including:
   an exterior surface (9) which is level with the vehicle body (1) exterior surface;
   a first edge (10a) which extends along the longitudinal direction;
   a second edge (11a) which is provided on an opposite side of the first edge (10a) and extends along the longitudinal direction; and
   an end part (14) provided at a tip in the longitudinal direction, wherein
   in a vicinity of the end part (14), the second edge (11a) gradually curbs toward the first edge (10a), and the second edge (11a) joins the first edge (10a) at the end part (14), and
   the resin garnish (7) is installed so that a gap (8) is formed between the end part (14) and the vehicle body (1) exterior surface, the gap (8) becoming wider as it gets closer to the tip of the resin garnish (7).

2. The resin garnish installation structure according to claim 1, further comprising an elastic lip (35) provided between the end part (14) of the resin garnish (7) and the vehicle body (1) exterior surface, wherein the elastic lip (35) becomes wider as it gets closer to the tip of the resin garnish (7).

3. The resin garnish installation structure according to claim 2, wherein the elastic lip (35) includes:
   a mold-cast portion (35) formed at the tip of the resin garnish (7) by a mold-casting, so as to become wider as it gets closer to the tip of the resin garnish (7); and
   an extrusion-mold portion (33) formed by an extrusion molding, and formed continuously with the mold-cast portion (35).

4. The resin garnish installation structure according to claim 3, wherein
   the tip of the resin garnish (7) is provided adjacent to a junction (24) between two parts of the vehicle body (1), and
   a junction between the mold-cast portion (35) and the extrusion-mold portion (33) is provided at a portion away from the junction (24) between two parts of the vehicle body (1).

* * * * *